US006265497B1

(12) United States Patent
Herzig

(10) Patent No.: US 6,265,497 B1
(45) Date of Patent: Jul. 24, 2001

(54) SILOXANE COPOLYMERS CONTAINING ALKENYL GROUPS

(75) Inventor: Christian Herzig, Waging am See (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/447,856

(22) Filed: Nov. 23, 1999

(30) Foreign Application Priority Data

Dec. 4, 1998 (DE) ................................................ 198 56 115

(51) Int. Cl.$^7$ ............................. C08L 83/05; C08L 83/07
(52) U.S. Cl. .............................. 525/478; 528/15; 528/31; 528/32; 528/25
(58) Field of Search ............................. 525/478; 528/25, 528/15, 31, 32

(56) References Cited

U.S. PATENT DOCUMENTS

| | | |
|---|---|---|
| 2,476,166 | 7/1949 | Wayo . |
| 3,445,420 | 5/1969 | Kookootsedes et al. . |
| 4,504,645 | 3/1985 | Melancon . |
| 5,225,511 | 7/1993 | Durfee . |
| 5,227,448 | 7/1993 | Durfee . |
| 5,241,034 | 8/1993 | Herzig et al. . |
| 5,866,666 | 2/1999 | Herzig et al. . |

FOREIGN PATENT DOCUMENTS

| | | |
|---|---|---|
| 41 23 423 A1 | 1/1993 | (DE) . |
| 195 22 144 A1 | 1/1997 | (DE) . |
| 196 46 642 A1 | 5/1997 | (DE) . |
| 196 27 022 A1 | 1/1998 | (DE) . |
| 196 29 053 A1 | 1/1998 | (DE) . |
| 197 01 393 A1 | 7/1998 | (DE) . |
| 0 523 660 A1 | 7/1992 | (EP) . |
| 0 534 206 A1 | 9/1992 | (EP) . |
| 0 786 463 A1 | 7/1997 | (EP) . |
| WO 93/22368 | 11/1993 | (WO) . |

OTHER PUBLICATIONS

The English Derwent Abstract AN 1998–399874 [35] Corresponding To DE 197 01 393 Is Enclosed.
The English Derwent Abstract AN 1997–053209 [06] Corresponding To DE 195 22 144 Is Enclosed.
The English Derwent Abstract 1993–019696 (03) corresponding to DE 4123423 is enclosed.
The English Derwent Abstract 1998–064258 (07) corresponding to DE 19627022 is enclosed.
The English Derwent Abstract 1997–212151 (19) corresponding to DE 19646642 is enclosed.
The English Derwent Abstract 1997–053209 (06) corresponding to DE 19522144 is enclosed.
The English Derwent Abstract 1997–374883 (35) corresponding to EP 0786463 is enclosed.
The English Derwent Abstract 1998–087924 (09) corresponding to DE 19629053 is enclosed.

*Primary Examiner*—Robert Dawson
*Assistant Examiner*—Kuo-Liang Peng
(74) *Attorney, Agent, or Firm*—Brooks & Kushman P.C.

(57) ABSTRACT

The invention provides alkenyl-containing siloxane copolymers preparable by reacting:

a compound (1) having at least three aliphatic double bonds, of the general formula $$R^2(CR^3=CH_2)_x$$

where
$R^2$ is a trivalent or tetravalent hydrocarbon of silane radical, and
$R^3$ is a hydrogen atom or an alkyl radical, with an organosiloxane having terminal Si-bonded hydrogen atoms, in the presence of a hydrosilylation catalyst, in a second step reacting:

the resulting hydrocarbon-siloxane copolymers containing Si-bonded hydrogen atoms with $\alpha,\omega$-dialkenylsiloxane polymer in the presence of a hydrosilylation catalyst, and, if desired, in a third step, equilibrating:

the resulting alkenyl-containing siloxane copolymers with an organopolysiloxane from the group consisting of linear organopolysiloxanes containing terminal triorganosiloxy groups, linear organopolysiloxanes containing terminal hydroxyl groups, branched organopolysiloxanes with or without hydroxyl groups, cyclic organopolysiloxanes, and copolymers of dioganosiloxane units and monoorganosiloxanes units.

17 Claims, No Drawings

SILOXANE COPOLYMERS CONTAINING ALKENYL GROUPS

TECHNICAL FIELD

The invention relates to alkenyl-containing siloxane copolymers and to a process for preparing them. The invention additionally relates to crosslinkable compositions which comprise an alkenyl-containing siloxane copolymer, an organopolysiloxane containing Si-bonded hydrogen atoms, and a catalyst, and to the use of said compositions to produce coatings which repel tacky substances.

BACKGROUND ART

U.S. Pat. No. 5,241,034 describes alkenyl-containing siloxane copolymers which are prepared by reacting an organic compound having two, three or four terminal aliphatic double bonds with organopolysiloxane having Si-bonded hydrogen atoms in the presence of a hydrosilylation catalyst. In the resulting copolymers the organopolysiloxane blocks are connected via hydrocarbon bridges.

In accordance with DE 41 23 423, branched alkenylsiloxane polymers are prepared which carry at least two alkenyl groups. The siloxanes used for the polyaddition reaction (final stage) have no more than two terminal SiH groups, whereas prior SiH-functional siloxanes used analogously, due to their branching, carried more than two SiH groups.

Alkenylsiloxanes are also discussed DE 196 466 42. In the latter, the alkenylsiloxanes acquire their branching by virtue of T units of the general structure $RSiO_{3/2}$, incorporated by equilibration. The DE 195 484 74 discloses branched vinylsiloxanes which contain T units of the formula $O_{1/2}R_2SiYRSiO$. DE 195 221 44 describes branched SiH precursors having siloxane segments of not more than 6 silicon atoms, which are reacted with an excess of α,ω-diene containing no siloxane units.

In DE 196 290 53 are disclosed polymers containing unsaturated end groups on siloxane segments which are attached directly to the organic branching unit. The preparation process involves complex hydrolytic steps and the use of halosilanes. DE 196 270 22 describes polymers which contain no organic branching units but instead customary siloxy structures as $RSiO_{3/2}$ and $SiO_{4/2}$.

SUMMARY OF INVENTION

An object of the present invention was therefore to provide alkenyl-containing siloxane copolymers which can be prepared in a simple process which permits the starting components to be reacted at low temperatures, as far as possible with little or no external heating, in a short time. A further object is to thusly prepare synthesis products which crosslink rapidly with organopolysiloxanes containing Si-bonded hydrogen atoms in the presence of catalysts which promote the addition of Si-bonded hydrogen onto aliphatic double bonds. A yet further object was to provide alkenyl-containing siloxane copolymers bearing more than two, equally reactive terminal alkenyl groups per molecule, in each case at the end of a siloxane chain, and whose synthesis can be performed even without incorporation of T units and/or Q units of the formula $RSiO_{3/2}$ and $SiO_{4/2}$, and in particular without the use of expensive α,ω-dienes. A still further object was to provide crosslinkable compositions suitable for producing coatings which repel tacky substances. These and other objects are achieved by means of the present invention.

DETAILED DESCRIPTION OF THE PREFERRED EMBODIMENTS

The invention provides alkenyl-containing siloxane copolymers preparable by:

in a first step, preparing a hydrocarbon-siloxane copolymer containing Si-bonded hydrogen atoms, by reacting a compound (1) having at least three aliphatic double bonds, of the general formula $R^2(CR^3=CH_2)_x$ where
$R^2$ is a trivalent or tetravalent hydrocarbon radical having preferably 1 to 25 carbon atoms per radical,
$R^3$ is a hydrogen atom or an alkyl radical having preferably 1 to 6 carbon atoms per radical, and
x is 3 or 4; with
an organosiloxane (2) having terminal Si-bonded hydrogen atoms in the presence of catalyst (3) which promotes the addition of Si-bonded hydrogen onto aliphatic double bond,
the ratio employed of Si-bonded hydrogen in the organosiloxane (2) to aliphatic double bonds in organic compound (1) being from 1.3 to 10, preferably from 1.5 to 5, in a second step reacting the hydrocarbon-siloxane copolymers containing Si-bonded hydrogen atoms prepared in said first step
with an α,ω-dialkenylsiloxane polymer (4) in the presence of catalyst (3) which promotes the addition of Si-bonded hydrogen onto aliphatic double bond,
the ratio employed of aliphatic double bonds in the α,ω-dialkenylsiloxane polymer (4) to Si-bonded hydrogen in the siloxane copolymers being from 1.2 to 10, preferably from 1.5 to 10, and, if desired, in a third step
equilibrating the resulting alkenyl-containing siloxane copolymers with at least one organopolysiloxane (5) selected from the group consisting of linear organopolysiloxanes containing terminal triorganosiloxy groups, linear organopolysiloxanes containing terminal hydroxyl groups, branched organopolysiloxanes with or without hydroxyl groups, cyclic organopolysiloxanes, and copolymers of diorganosiloxane units and monoorganosiloxane units.

The invention additionally provides a process for preparing alkenyl-containing siloxane copolymers, comprising:

in a first step reacting in a first step, preparing a hydrocarbon-siloxane copolymer containing Si-bonded hydrogen atoms, by reacting
a compound (1) having at least three aliphatic double bonds, of the general formula $R^2(CR^3=CH_2)_x$ where
$R^2$ is a trivalent or tetravalent hydrocarbon radical having preferably 1 to 25 carbon atoms per radical,
$R^3$ is a hydrogen atom or an alkyl radical having preferably 1 to 6 carbon atoms per radical, and
x is 3 or 4; with
an organosiloxane (2) having terminal Si-bonded hydrogen atoms in the presence of catalyst (3) which promotes the addition of Si-bonded hydrogen onto aliphatic double bond, the ratio employed of Si-bonded hydrogen in the organosiloxane (2) to aliphatic double bonds in organic compound (1) being from 1.3 to 10, preferably from 1.5 to 5, in a second step reacting the hydrocarbon-siloxane copolymers containing Si-bonded hydrogen atoms prepared in said first step with an α,ω-dialkenylsiloxane polymer (4) in the presence of catalyst (3) which promotes the addition of Si-bonded hydrogen onto aliphatic double bond, the ratio employed of aliphatic double bonds in the α,ω-dialkenylsiloxane polymer (4) to Si-bonded hydrogen in the siloxane copolymers being from 1.2 to 10, preferably from 1.5 to 10, and, if desired, in a third step equilibrating the resulting alkenyl-containing siloxane copolymers with at least one organopolysiloxane (5) selected from the group consisting of linear organopolysiloxanes containing terminal triorganosiloxy groups, linear organopolysiloxanes containing terminal hydroxyl groups, branched organopolysiloxanes with or without hydroxyl groups, cyclic organopolysiloxanes, and copolymers of diorganosiloxane units and monoorganosiloxane units.

In the alkenyl-containing siloxane copolymers of the invention the siloxane blocks are preferably connected to one another via hydrocarbon bridges, thus resulting in a hydrocarbon-siloxane block structure. The structure of alkenyl-containing siloxane copolymers is described in the above-cited U.S. Pat. No. 5,241,034, which is incorporated herein by reference.

The alkenyl-containing siloxane copolymers of the invention preferably have a viscosity of from 0.05 to 500,000 Pa·s at 25° C., more preferably from 0.1 to 100,000 Pa·s at 25° C., with particular preference from 0.2 to 10,000 Pa·s at 25° C.

In one preferred embodiment, the preparation of the siloxane copolymers of the invention takes place in a solvent, preferably a hydrocarbon having a boiling point below 150° C., and preferably with a concentration of 20–60% by weight siloxane. Higher or lower concentrations of siloxane are useful in the present invention as well.

The organosiloxanes (2) used in the first process step preferably contain two Si-bonded hydrogen atoms per molecule. In this first process step, it is possible to use a single organosiloxane (2), or different types of organosiloxanes (2). The organosiloxane (2) in the first process step is preferably of the general formula

$HR_2SiO(SiR_2O)_nSiR_2H$ where each R individually is preferably an identical or different, optionally halogenated hydrocarbon radical having 1 to 6 carbon atoms per radical, and is 0 or a positive integer, with particular preference given to integers from 7 to 2000, all integers between 0 and 2000 being considered as being specified explicitly.

In the first process step it is possible to use a single compound (1) or different types of compounds (1). The compound (1) used in the first process step is preferably one in which $R^2$ is a trivalent hydrocarbon radical preferably having 1 to 25 carbon atoms per radical, and x denotes a value of 3.

The α,ω-dialkenylsiloxane polymer (4) used in the second process step is preferably of the general formula

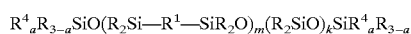
$R^4{}_aR_{3-a}SiO(R_2Si-R^1-SiR_2O)_m(R_2SiO)_kSiR^4{}_aR_{3-a}$ where R is as defined above, $R^1$ is a divalent hydrocarbon radical, preferably an alkylene radical having 2 to 10 carbon atoms per radical, or is a divalent silane or siloxane radical, preferably one having preferably 2 to 10 Si units, $R^4$ is a terminally olefinically unsaturated radical having 2 to 10 carbon atoms, a is identical or different and is 0 or 1, on average from 0.7 to 1.0, m is 0 or an integer preferably from 1 to 10, and k is 0 or an integer preferably from 1 to 1000.

In the second process step it is possible to use a single α,ω-dialkenylsiloxane polymer (4) or different types of α,ω-dialkenylsiloxane polymer (4).

Examples of radicals R are preferably alkyl radicals such as the methyl, ethyl, n-propyl, isopropyl, 1-n-butyl, 2-n-butyl, isobutyl, and tert-butyl radicals. The methyl radical is preferred. Examples of halogenated radicals R are haloalkyl radicals such as, preferably, the 3,3,3-trifluoro-n-propyl radical, the 2,2,2,2',2',2'-hexafluoroisopropyl radical, and the heptafluoroisopropyl radical.

Examples of alkyl radicals $R^3$ are preferably the methyl, ethyl, n-propyl, isopropyl, 1-n-butyl, 2-n-butyl, isobutyl, tert-butyl, n-pentyl, isopentyl, neopentyl, tert-pentyl radicals, and hexyl radicals such as the n-hexyl radical. $R^3$ is preferably a hydrogen atom.

Specific but non-limiting examples of compound (1) from which the alkenyl-containing siloxane copolymers of the invention are preparable, are: 1,2,4-trivinylcyclohexane, 1,3, 5-trivinylcyclohexane, 3,5-dimethyl-4-vinyl-1,6-heptadiene, 1,2,3,4-tetravinylcyclobutane, methyltrivinylsilane, and tetravinylsilane, preference being given to 1,2,4-trivinylcyclohexane.

Examples of the radical $R^2$ are therefore those of the formula

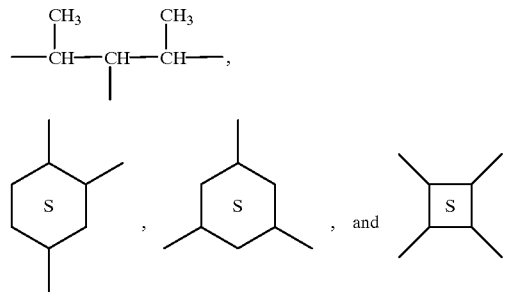

preference being given to the radical of the formula

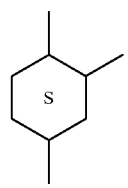

Examples of α,ω-dialkenylsiloxane polymers (4) from which the alkenyl-containing siloxane copolymers of the invention are preparable, are: α,ω-divinylpolydimethylsiloxane, α,ω-diallylpolydimethylsiloxane, α,ω-dihexylpolydimethylsiloxane, α,ω-dioctenylpolydimethylsiloxane; and polyadducts of organosiloxane (2) and dienes such as 1,5-hexadiene, 1,7-octadiene, 1,9-decadiene, 1,11-dodecadiene, 1,13-tetradecadiene, 3,5-dimethyl-1,6-heptadiene, 1,3-divinylbenzene, 1,4-divinylbenzene, 1,3-diisopropenylbenzene, divinyldimethylsilane, and 1,3-divinyl-1,1,3,3-tetramethyldisiloxane, preference being given to α,ω-divinylpolydimethylsiloxanes and α,ω-dihexenylpolydimethylsiloxanes.

Depending on the target product, the α,ω-dialkenylsiloxane polymers of the invention preferably have average molecular weights of from 186 to approximately 30,000 daltons, particular preference being given to the range from 1000 to 15,000 daltons.

Examples of the radical $R^1$ are preferably those of the formula $-(CH_2)_2-$, $-(CH_2)_4-$, $-(CH_2)_6-$, $-(CH_2)_8-$, $-(CH_2)_{10}-$, $C_6H_4-$, and

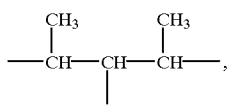

preference being given to the radical of the formula $-(CH_2)_2-$.

Organosiloxane (2) is used in the first process step in amounts such that the ratio of Si-bonded hydrogen in organosiloxane (2) to aliphatic double bonds in compound (1) is from 1.3 to 10, preferably from 1.5 to 4.0, with particular preference from 1.8 to 3.0. Since organosiloxane (2) is used in excess, preferably all aliphatic double bonds in the compound (1) are therefore consumed by reaction in the first process step, and siloxane copolymers are obtained which have Si-bonded hydrogen atoms.

The first process step, the reaction of compound (1), such as 1,2,4-trivinylcyclohexane, with an excess of organosiloxane (2), for example 1,3-dihydro-1,1,3,3-tetramethyldisiloxane, in the presence of catalyst (3), can be represented by the following reaction scheme (1):

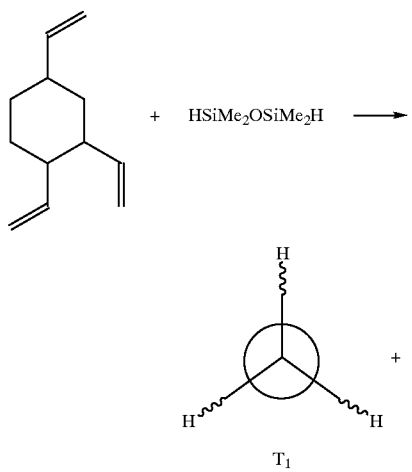

-continued

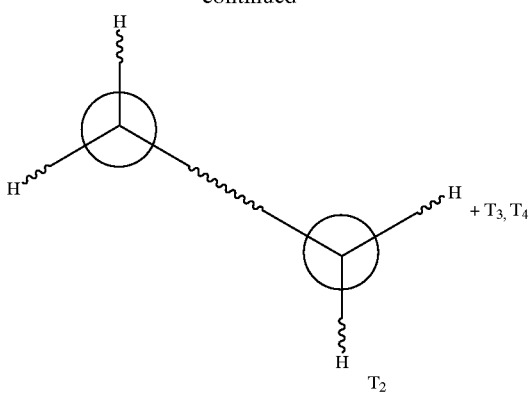

The resulting siloxane copolymer mixture preferably contains a fraction of more than 50% of individual compounds $T_1$ and $T_2$, the remainder being more highly branched polymers $T_3$, $T_4$, etc.

Depending on the stoichiometric ratio H—Si/C=C the siloxane copolymer mixture contains varying amounts of organosiloxane (2), which at low molecular weights can be removed in vacuo but otherwise remains in the product mixture as a component having active hydrogen.

As catalysts (3) which promote the addition of Si-bonded hydrogen onto aliphatic double bondsit is possible in the process of the invention to use the same catalysts which have been used to date to promote the addition of Si-bonded hydrogen onto aliphatic double bond. The catalysts (3) preferably comprise a metal from the group of the platinum metals, or a compound or complex from the group of the platinum metals. Examples of such catalysts are metallic and finely divided platinum, which can be on supports such as silica, alumina or activated carbon; compounds or complexes of platinum such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes such as platinum-1,3-divinyl-1,1,3,3-tetramethyldisiloxane complexes containing or not containing detectable inorganically bonded halogen; bis(gamma-picoline)platinum dichloride, trimethylenedipyridineplatinum dichloride, dicyclopentadieneplatinum dichloride, dimethyl sulfoxide-ethyleneplatinum(II) dichloride, cyclooctadieneplatinum dichloride, norbornadieneplatinum dichloride, gamma-picolineplatinum dichloride, and cyclopentadieneplatinum dichloride.

The catalyst (3) is preferably used in the first process step in amounts of from 0.5 to 100 ppm by weight (parts by weight per million parts by weight), more preferably in amounts of from 2 to 10 ppm by weight, calculated in each case as elemental platinum and based on the overall weight of compound (1) and organosiloxane (2).

The first process step is preferably conducted under the pressure of the surrounding atmosphere, i.e., approximately at 1020 hPa (abs.), although it can also be conducted under higher or lower pressures. In addition, the first process step is conducted preferably at a temperature of from 20° C. to 150° C., more preferably from 20° C. to 120° C., with particular preference from 20° C. to 100° C.

Since the compound (1) having at least three aliphatic double bonds, e.g., 1,2,4-trivinylcyclohexane, tends toward polymerization at relatively high temperatures, it is preferable, in the first process step, to use free-radical inhibitors such as 4-methoxyphenol, 2,6-bis(tert-butyl)-4-methylphenol, phenothiazine, hydroquinone or pyrocatechol. These free-radical inhibitors are preferably used in amounts of from 10 to 500 ppm by weight, based on the overall weight of compound (1) and organosiloxane (2).

In the first and in the second process steps it is preferable to use inert, organic solvents. Examples of inert organic solvents are toluene, xylene, octane isomers, heptane isomers, butyl acetate, 1,2-dimethoxyethane, tetrahydrofuran, and cyclohexane. The inert organic solvents which may optionally be used can be removed by distillation following the first or second process step or can remain in the reaction mixture. The α,ω-dialkenylsiloxane polymer (4) of the second process step is employed in amounts such that the ratio of aliphatic double bonds in the α,ω-dialkenylsiloxane polymer (4) to Si-bonded hydrogen in the hydrocarbon-siloxane copolymer obtained in the first step is from 1.2 to 10, preferably from 1.5 to 5.0, with particular preference from 1.5 to 3.0. Since the α,ω-dialkenylsiloxane polymer (4) is used in excess, in the second process step, all Si-bonded hydrogen atoms of the hydrocarbon-siloxane copolymers obtained in the first process step are therefore preferably consumed by reaction, and alkenyl-containing siloxane copolymers are obtained.

The catalyst (3) is used in the second process step preferably in amounts of from 0.5 to 100 ppm by weight (parts by weight per million parts by weight), more preferably in amounts of from 2 to 10 ppm by weight, calculated in each case as elemental platinum and based on the overall weight of α,ω-dialkenylsiloxane polymer (4) and the hydrocarbon-siloxane copolymers containing Si-bonded hydrogen atoms that are obtained in the first process step.

The second process step is preferably conducted under the pressure of the surrounding atmosphere, i.e., approximately at 1020 hPa (abs.), although it can also be conducted under higher or lower pressures. In addition, the second process step is conducted at a temperature of preferably from 20° C. to 150° C., more preferably from 20° C. to 120° C.

The alkenyl-containing siloxane copolymers obtained in the second process step can, in a third process step, be equilibrated with organopolysiloxane (5). In the optional third process step, the equilibration increases the average chain lengths of the components (2) and (4) used.

Also in the third process step, relatively highly branched siloxane copolymers are obtained. In the course of the equilibration, as is known to the skilled artisan, the formation of rings devoid of functional groups, in amounts of from 8 to 15% by weight is unavoidable but not disruptive. If desired, volatile fractions thereof (rings having 3–9 Si atoms) can be removed from the product mixture by means of vacuum and relatively high temperatures. As is the case with the rings, it is also possible for other unwanted but nondisruptive by-products to be obtained in small amounts in the course of the equilibration.

The organopolysiloxanes (5) used in the equilibration are preferably those selected from the group consisting of linear organopolysiloxanes containing terminal triorganosiloxy groups, of the formula $R_3SiO(SiR_2O)_rSiR_3$ where R is as defined above, and
r is 0, or preferably an integer of from 1 to 1500, more preferably from 10 to 300; linear organopolysiloxanes containing terminal hydroxyl groups, of the formula $HO(SiR_2O)_sH$ where R is as defined above, and s is preferably is an integer of from 1 to 1500, more preferably from 10 to 300; branched organopolysiloxanes with or without hydroxyl groups and composed of units of the formula $R_3SiO_{1/2}$, $R_2SiO$, and $RSiO_{3/2}$, where R is as defined above;
cyclic organopolysiloxanes of the formula $(R_2SiO)_t$ where R is as defined above, and t is an integer from 3 to 12;
and copolymers composed of units of the formula $R_2SiO$ and $RSiO_{3/2}$, where R is as defined above.

Preferred organopolysiloxanes (5) are preferably those of the formulae $R_3SiO(SiR_2O)_rSiR_3$, $HO(SiR_2O)_sH$, and $(R_2SiO)_t$, particular preference being given to those of the formula $R_3SiO(SiR_2O)_rSiR_3$. The quantitative ratio of the organopolysiloxanes (5) used in the optional equilibration to the alkenyl-containing siloxane copolymers, is determined solely by the desired fraction of the alkenyl groups in the siloxane copolymers produced in the course of the equilibration, and by the desired average chain length.

In the optional equilibration, it is preferred to use basic or acidic catalysts which promote the equilibration. Preferred examples of such catalysts are alkali metal hydroxides such as sodium hydroxide, potassium hydroxide, and cesium hydroxide, trimethylbenzylammonium hydroxide, and tetramethylammonium hydroxide. Alkali metal hydroxides are preferred. Alkali metal hydroxides are used preferably in amounts of from 50 to 10,000 ppm by weight, in particular from 500 to 2000 ppm by weight, based in each case on the overall weight of the alkenyl-containing siloxane copolymers and organopolysiloxanes (5) used.

Examples of acidic catalysts are preferably sulfuric acid, phosphoric acid, trifluoroacetic acid, phosphonitrile chlorides, and acidic catalysts which are solid under the reaction conditions, such as acid-activated bleaching earth, acidic zeolites, sulfonated carbon, and sulfonated styrene-divinylbenzene copolymer. Preference is given to phosphonitrile chlorides. Phosphonitrile chlorides are used preferably in amounts of from 5 to 1000 ppm by weight, in particular from 50 to 200 ppm by weight, based in each case on the overall weight of the organosilicon compounds used.

Equilibration is preferably carried out at from 100° C. to 150° C. under the pressure of the surrounding atmosphere, i.e., approximately at 1020 hPa (abs.). If desired, it is also possible to employ higher or lower pressures. The equilibration preferably takes place in the presence of from 5 to 20% by weight, based on the overall weight of the alkenyl-containing siloxane copolymers and organopolysiloxanes (5) used, of a water-immiscible solvent, such as toluene. The catalyst can be deactivated prior to the workup of the mixture obtained in the equilibration.

The process of the invention can be conducted batchwise, semicontinuously, or fully continuously.

As an alternative to the above-described sequence of the process steps for preparing alkenyl-containing hydrocarbon-siloxane copolymers it is also possible, if desired, for the average molecular weight to be raised, and/or for the chains of the hydrocarbon-siloxane copolymers containing active hydrogen that are obtained in the 1$^{st}$ process step to be extended directly thereafter in a 2$^{nd}$ process step. For this purpose the same organopolysiloxanes (5) are used and are reacted under the conditions described there. Preferred organopolysiloxanes (5) are those of the formulae R$_3$SiO(SiR$_2$O)$_r$SiR$_3$, HO(SiR$_2$O)$_s$H, and (R$_2$SiO)$_t$, particular preference being given to those of the formula R$_3$SiO(SiR$_2$O)$_r$SiR$_3$, and R being as defined above.

In the case of this alternative sequence of the process steps, the hydrocarbon-siloxane copolymers containing active hydrogen that are obtained by equilibration are subsequently reacted, in a 3$^{rd}$ process step, with α,ω-dialkenylsiloxane polymer (4), which is preferably used in amounts such that the ratio of aliphatic double bonds in (4) to Si-bonded hydrogen in the copolymer obtained beforehand is preferably 1.5–5.0, with particular preference to ratios of 1.5–3.0. In the case of this alternative sequence of the process steps, therefore, the steps described initially have merely been altered in sequence, so that process step 3 of the first disclosed process is performed before process step 2. It is further possible to perform two separate equilibrations.

The alkenyl-containing siloxane copolymers of the invention may be crosslinked with organopolysiloxanes containing Si-bonded hydrogen, in the presence of hydrosilylation catalysts. In addition, the alkenyl-containing siloxane copolymers of the invention may also be crosslinked with organic polymers containing mercapto groups. The alkenyl-containing siloxane copolymers of the invention are preferably used in crosslinkable compositions which comprise
(A) alkenyl-containing siloxane copolymers,
(B) organopolysiloxanes containing Si-bonded hydrogen atoms, and
(C) catalysts which promote the addition of Si-bonded hydrogen onto aliphatic double bonds and also, if desired, preferably
(D) inhibitor(s).

The crosslinkable compositions of the invention preferably contain solvents, most preferably hydrocarbons having a boiling point preferably below 150° C., and preferably have a siloxane content of 20–60% by weight, higher or lower concentrations being possible as well.

The crosslinkable compositions comprising the siloxane copolymers of the invention are preferably used to produce coatings which repel tacky substances, for example, to produce release papers.

The preparation of the materials associated with release paper may take place by the off-line method or the in-line method. In the case of the off-line method, the silicone composition is applied to the paper or other substrate, and crosslinked. In a subsequent stage, usually after the release paper has been wound up onto a reel and after the resulting roll has been stored, an adhesive film which is found, for example, on a paper label, is applied to the coated paper and the assembly compressed. In the case of the in-line method, the silicone composition is applied to the paper and crosslinked, the silicone coating is coated with the adhesive, the label face paper is then applied to the adhesive and finally the assembly compressed.

In the case of the compositions of the invention it is possible to use a single siloxane co-polymer (A), which is preferred, or different types of siloxane copolymers (A).

As constituent (B) the compositions of the invention may include all the organopolysiloxanes containing Si-bonded hydrogen atoms which have been used in the past for addition crosslinking compositions containing organopolysiloxanes bearing vinyl groups, organopolysiloxanes bearing Si-bonded hydrogen atoms, and catalysts which promote the addition of Si-bonded hydrogen onto aliphatic double bonds. The organopolysiloxanes (B) preferably contain at least 3 Si-bonded hydrogen atoms.

As constituent (B) it is preferred to use organopolysiloxanes composed of units of the formula

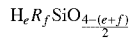

where R is as defined above,
e is 0 or 1,
f is 0, 1, 2 or 3, and
the sum e+f is not greater than 3,
preferably those of the formula

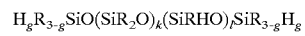

where R is as defined above,
g is 0 or 1,
k is 0, or is preferably an integer from 1 to 100, and
l is 0, or is preferably an integer from 1 to 100.

Examples of organopolysiloxanes (B) are, in particular, copolymers composed of dimethylhydrosiloxane, methylhydrosiloxane, dimethylsiloxane and trimethylsiloxane units, copolymers composed of trimethylsiloxane, dimethylhydrosiloxane and methylhydrosiloxane units, copolymers composed of trimethylsiloxane, dimethylsiloxane and methylhydrosiloxane units, copolymers composed of methylhydrosiloxane and trimethylsiloxane units, copolymers composed of methylhydrosiloxane, diphenylsiloxane and trimethylsiloxane units, copolymers composed of methylhydrosiloxane, dimethylhydrosiloxane and diphenylsiloxane units, copolymers composed of methylhydrosiloxane, phenylmethylsiloxane, trimethylsiloxane and/or dimethylhydrosiloxane units, copolymers composed of methylhydrosiloxane, dimethylsiloxane, diphenylsiloxane, trimethylsiloxane and/or dimethylhydrosiloxane units, and copolymers composed of dimethylhydrosiloxane, trimethylsiloxane, phenylhydrosiloxane, dimethylsiloxane and/or phenylmethylsiloxane units.

Further preferred embodiments of constituent (B) are polymers having Si-bonded hydrogen, as described in the applications EP 786 463 page 5, line 32 et seq. under "B$^1$" and in the German Application P 197 551 51 page 4, line 32 et seq. Particularly preferred embodiments of the spacers "G" defined therein are the following radicals:

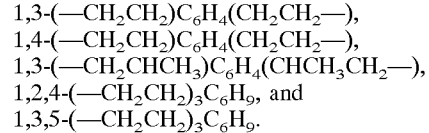

Processes for preparing organopolysiloxanes (B), including those organopolysiloxanes (B) of the preferred type, are known in the art and/or described in the aforementioned publications.

Organopolysiloxane (B) is used preferably in amounts of from 0.5 to 6 gram atom, preferably from 1 to 3 gram atom, with particular preference from 1.5 to 2.5 gram atom of Si-bonded hydrogen per mole of alkenyl group —CR$^3$=CH$_2$ in the alkenyl-containing siloxane copolymers (A), R being as defined above.

As catalyst (C) which promotes the addition of Si-bonded hydrogen onto aliphatic double bond it is also possible in the case of the crosslinkable compositions according to the invention to use the same catalysts which have been used in the past for crosslinking organopolysiloxanes containing aliphatic double bonds with compounds containing Si-bonded hydrogen, in order to promote the crosslinking. As constituent (C) it is preferred to use the abovementioned catalysts (3).

Catalyst (C) is used preferably in amounts of from 5 to 500 ppm by weight, in particular from 10 to 200 ppm by weight, calculated in each case as elemental platinum metal and based on the overall weight of the siloxane copolymer (A) and organopolysiloxane (B). Examples of further constituents which can be used in the case of the compositions of the invention are agents which retard the addition of Si-bonded hydrogen onto aliphatic double bonds at room temperature, known as inhibitors (D), agents for adjusting the release force, solvents, adhesion promoters, and pigments.

As inhibitors (D) it is possible to use all inhibitors which have been used to date for the same purpose. Examples of inhibitors are preferably 1,3-divinyl-1,1,3,3-tetramethyldisiloxane, benzotriazole, dialkylformamides, alkylthioureas, methyl ethyl ketoxime, organic compounds or organosilicon compounds having a boiling point of at least 25° C. at 1012 mbar (abs.) and at least one aliphatic triple bond, in accordance with U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyne-2,5-diol, 3,5-dimethyl-1-hexyn-3-ol and 3,7-dimethyloct-1-yn-6-en-3-ol; inhibitors according to U.S. Pat. No. 2,476,166, such as a mixture of diallyl maleate and vinyl acetate; and inhibitors according to U.S. Pat. No. 4,504,645, such as maleic monoesters.

Preferably, the inhibitor (D) is used in amounts of from 0.001 to 10% by weight, based on the overall weight of the siloxane copolymers (A) and organopolysiloxanes (B), and with particular preference from 0.1 to 0.5% by weight.

Examples of agents for adjusting the release force of the coatings which are produced with the compositions of the invention and which repel tacky substances are silicone resins composed of units of the formula

 and $SiO_2$, known as MQ resins, where $R^4$ is a hydrogen atom, a methyl radical, a vinyl radical, or a radical A, which is described in the initially cited U.S. Pat. No. 5,241,034 in column 2, line 24 et seq. and has been incorporated by reference. The units of the formula $R^4(CH_3)_2SiO_{1/2}$ can be identical or different. The ratio of units of the formula $R^4(CH_3)_2SiO_{1/2}$ to units of the formula $SiO_2$ is preferably from 0.6 to 2. The silicone resins are used preferably in amounts of from 5 to 80% by weight, based on the overall weight of the siloxane copolymers (A) and organopolysiloxanes (B).

The solvents which can be used if desired are the same solvents which have been used date in compositions comprising organopolysiloxanes containing Si-bonded vinyl groups, organopolysiloxanes containing S-bonded hydrogen, and catalysts which promote the addition of Si-bonded hydrogen onto aliphatic double bonds. Examples of such solvents are petroleum spirits, e.g., alkane mixtures preferably having a boiling range of from 80° C. to 110° C. at 1012 mbar (abs.), n-heptane, benzene, toluene and xylenes, halogenated alkanes having 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are used as well, then they are preferably judiciously used in amounts of from 10 to 95% by weight, based on the weight of alkenyl-containing siloxane copolymers (A), more preferably from 40 to 70% by weight.

Although the sequence for mixing the constituents (A), (B), (C) and, if used, (D) is not critical, it has nevertheless been found suitable for practical purposes to add the constituent (C), i.e., the catalyst, last to the mixture of the other constituents.

The crosslinking of the compositions of the invention preferably takes place at from 50° C. to 150° C. An advantage in the case of the compositions of the invention is that rapid crosslinking is achieved even at low temperatures. Energy sources used for the crosslinking by heating are preferably ovens, e.g., circulating-air drying ovens, heating tunnels, heated rollers, heated plates, or thermal radiation in the infrared range.

Besides heating, the compositions of the invention can also be crosslinked by irradiation with ultraviolet light or by irradiation with UV and IR light. The ultraviolet light used is customarily that having a wavelength of preferably 253.7 nm. In commerce there are a large number of lamps which emit ultraviolet light with a wavelength of from 200 to 400 nm, and which preferentially emit ultraviolet light with a wavelength of 253.7 nm.

The application of the compositions of the invention to the surfaces to be made repellent to tacky substances can be accomplished in any desired manner which is suitable and widely known for the production of coatings from liquid substances by, for example, dipping, brushing, pouring, spraying, rolling, printing, by means for example of an offset gravure coating device, by blade coating or knife coating, or by means of an airbrush.

The surfaces which are to be made repellent to tacky substances and which can be treated in the context of the invention can comprise surfaces of any desired substances which are solid at room temperature and 1012 mbar (abs.). Examples of such surfaces are those of paper, wood, cork and polymer films, e.g., polyethylene films, polyester films or polypropylene films, woven and nonwoven cloth of natural or synthetic fibers or glass fibers, ceramic articles, glass, metals, polyethylene-coated paper, and boards, including those of asbestos. The abovementioned polyethylene can in each case comprise high-pressure, medium-pressure or low-pressure polyethylene. The paper can comprise low-grade paper types, such as absorbent papers, including kraft paper which is crude, i.e., has not been pretreated with chemicals and/or polymeric natural substances, and having a weight of preferably from 60 to 150 g/m². Unsized papers, papers of low freeness value, mechanical papers, unglazed or uncalendered papers, papers which are smooth on one side owing to the use of a dry glazing cylinder during their production, without additional complex measures, and are therefore referred to as "machine-glazed papers", uncoated papers or papers produced from wastepaper, i.e., so-called recycled papers can also be used. The paper to be treated in accordance with the invention can also, however, of course comprise high-grade papers, such as low-absorbency papers, sized papers, papers of high freeness value, chemical papers, calendered or glazed papers, glassine papers, parchmentized papers, or precoated papers. The boards may also be of low or high grade.

The compositions of the invention are suitable, for example, for the production of release, backing and interleaving papers, including interleaving papers which are used in the production of, for example, cast films or decorative films, or of foams, including those of polyurethane. The compositions of the invention are also suitable, for example, for the production of release, backing and interleaving boards, films and cloths, for treating the reverse sides of self-adhesive tapes or self-adhesive sheets or the written faces of self-adhesive labels. The compositions of the invention are also suitable for treating packing material, such as that comprising paper, cardboard cartons, metal foils and drums, for example, cardboard, plastic, wood or iron, which is or are intended for the storage and/or transportation of tacky goods, such as adhesives, sticky foodstuffs, e.g., cakes, honey, candies and meat, bitumen, asphalt, greased materials, and crude rubber. A further example of the use of the compositions of the invention is the treatment of backings for the transfer of pressure-sensitive adhesive layers in the so-called transfer process.

The compositions of the invention are suitable for the production of the self-adhesive materials connected to the release paper, both by the off-line method and by the in-line method.

EXAMPLE 1 a) 20.0 g of 1,2,4-trivinylcyclohexane are mixed homogeneously with 423.3 g of an $\alpha,\omega$-dihydropolydimethylsiloxane having an active-hydrogen content of 0.224% H. At room temperature (23° C.), 1.0 mg of platinum is added in the form of a solution of Karstedt catalyst in vinylsiloxane. An exothermic reaction ensues which is over within a few minutes. This gives a clear polyadduct having a viscosity of 262 mm$^2$/s (25° C.) and an iodine number of 33.2.

1 kg of product contains 1.30 g of Si-bonded hydrogen. C=C double bonds can no longer be detected in the $^1$H-NMR spectrum (degree of conversion>99.8%).

b) In the $2^{nd}$ stage, 71.8 g of this precursor are mixed with 280.6 g of an $\alpha,\omega$-divinylpolydimethylsiloxane having an average molecular weight of 2670 g and this mixture is initiated with 3.5 mg of Pt in the form of Karstedt catalyst solution. With vigorous stirring, the internal temperature of the reaction vessel rises from 22 to 37° C. After a total reaction period of 3 hours, a degree of conversion of more than 99.8% has been reached. The polyadduct has a viscosity of 280 mm$^2$/s (25° C.) with an iodine number of 8.6. 1 kg of product therefore contains 0.34 meq of vinyl groups.

EXAMPLE 2

The precursor from Example 1a can also be used to prepare a highly viscous vinyl polymer: 2.4 g of this precursor having an iodine number of 33.2 are homogenized with 114.3 g of an $\alpha,\omega$-divinylpolydimethylsiloxane with an average chain length of 635 siloxy units, diluted with 391 g of toluene, and initiated with Karstedt catalyst solution (1.2 mg of Pt). In the course of stirring at room temperature there is a sharp increase in viscosity. After about 2.5 hours, the final viscosity of 420 mm$^2$/s has been reached, and shows no change even on storage for more than 4 weeks. 1 kg of the solution contains 7.9 meq of vinyl groups.

EXAMPLE 3 a) In a manner similar to that used in Example 1a, an SiH-functional precursor is prepared from 26.3 g of trivinylcyclohexane and 530.4 g of the $\alpha,\omega$-dihydropolydimethylsiloxane used therein.

b) 13.5 g of this polymer of viscosity 28.3 mm$^2$/s (25° C.), which can contain less than 0.2 mol% of the C=C double bonds used, are mixed homogeneously with 183.8 g of a linear $\alpha,\omega$-divinylpolydimethylsiloxane of average chain length $Si_{170}$ and 161.5 g of toluene.

At room temperature, 2.0 mg of Pt in the form of Karstedt catalyst solution are added to the vinyl polymer. After stirring for 2 hours without external heating, the viscosity of the solution reaches 800 mm$^2$/s and has a vinyl content of 38 meq/kg.

EXAMPLE 4

The same polymers as in Example 3b are mixed, but the proportion in which they are used changes: 10.0 g of SiH-functional precursor are mixed homogeneously with 111.0 g of vinyl polymer and 282.3 g of toluene and activated with 60% of the catalyst used therein (10 mg of Pt/kg of siloxane). After 3 hours at room temperature the polymer solution has reached a viscosity of 3400 mm$^2$/s and has a vinyl group concentration of approximately 13 meq/kg.

EXAMPLE 5 a) Low molecular weight polyadducts are prepared from 706.1 g of 1,1,3,3-tetramethyldisiloxane by metered addition of a total of 162.9 g of 1,2,4-trivinylcyclohexane with platinum catalysis. The reactor temperature rises during the metered addition over 2 hours from 23° C. to reflux temperature. For complete reaction, the batch is held at approximately 90° C. for 2 hours more and then unreacted disiloxane is removed by distillation. The product has a viscosity of 47.6 mm$^2$/s and contains 4.305 g of Si-bonded hydrogen per kg.

b) Then, in succession, 8.5 g of this precursor and 7.5 g of the $\alpha,\omega$-dihydropolydimethylsiloxane used in Example 1a are added to a solution of 300.0 g of the $\alpha,\omega$-divinylpolydimethylsiloxane used in Example 2, with a degree of polymerization of 635, in 700 g of toluene. At room temperature, initiation is carried out with 3 mg of Pt in the form of the Karstedt catalyst solution. In 3 hours, viscosity becomes constant at 355 mm$^2$/s. A greatly enlarged $^1$H-NMR spectrum no longer reveals any residual Si-bonded hydrogen. The clear, colorless polymer solution has a vinyl group content of 7.5 meq/kg.

EXAMPLE 6

The polyadduct prepared in Example 5a, having a viscosity of 47.6 mm$^2$/s, is mixed homogeneously in an amount of 3.3 g with 2.8 g of the $\alpha,\omega$-dihydropolydimethylsiloxane used in Example 1a and 161.3 g of $\alpha,\omega$-divinylpolydimethylsiloxane having a degree of polymerization of 118, and also 167.4 g of toluene. Following the admixture of 1.6 mg of platinum in the form of Karstedt catalyst solution at 23° C., the mixture is stirred for 3 hours without external heating. The batch reaches a viscosity of 1090 mm$^2$/s and, following the reaction of all SiH groups, contains approximately 52 meq of vinyl functions per kg.

EXAMPLE 7

In comparative experiments, the polymer from Example 6 is compared with a commercial vinyl polymer having a viscosity of 6000 mm$^2$/s (30% strength) and exclusively lateral vinyl groups (approximately 105 ViMeSiO/molecule), in formulations which are optimized in each case.

| Constituents | Inventive | Comparative |
|---|---|---|
| Polymer solution | 10,000 g (50% strength) | 16,667 g (30% strength) |
| Inhibitor | 12 g | 12 g |
| Crosslinker | 173 g | 267 g |
| Toluene | 39,765 g | 39,671 g |
| Catalyst | 50 g | 50 g |
| Viscosity (4 mm cup) | 13.0" | 33.5" |

The inhibitor used was methylbutynol, and the crosslinker is a copolymer which contains hydrodimethylsiloxy, hydromethylsiloxy, dimethylsiloxy, and trimethylsiloxy groups. The viscosity is 94 mm$^2$/s, the Si-bonded hydrogen content is 0.6% by weight. The catalyst used was the Karstedt catalyst, dissolved in α,ω-divinylpolydimethylsiloxane; the platinum concentration is 1% by weight, i.e., 100 ppm based on polymer in the formulation.

The 10% strength solution in toluene is applied to glassine paper (80 g/m$^2$) using a screen-roller application unit and cured in a drying oven at a circulating-air temperature of 180° C. The quality of vulcanization is assessed at increasing web speeds on the basis of the migration test (1=no migration to 6=severe migration) and of the fractions still extractable from the vulcanizate (% of the coating).

Age of the Formulation: About ½ Hour

| | Migration | | Extractables | |
|---|---|---|---|---|
| Web speed | inventive | comparative | inventive | comparative |
| 50 m/min | 1 | 1 | 6.8 | 7.3 |
| 100 | 1 | 1 | | |
| 200 | 1 | 3 | 9.8 | 11.1 |
| 300 | 2 | 5 | 10.9 | 18.3 |

Age of the Formulation: About 18 Hours

| | Migration | | Extractables | |
|---|---|---|---|---|
| Web speed | inventive | comparative | inventive | comparative |
| 50 m/min | 1 | 2 | 2.9 | 8.3 |
| 100 | 1 | 2 | 5.0 | 10.0 |
| 150 | 1 | greasy | — | — |
| 200 | 1 | — | 6.0 | — |
| 250 | 4 | — | 8.9 | — |
| 300 | greasy | — | — | — |

With a comparable quality of vulcanization, the formulation of the invention can be processed significantly more rapidly than standard product. In addition, it is considerably more stable with respect to a drop in activity as a result of ageing.

By the terms "a" and "an" are meant one or more unless otherwise indicated to the contrary.

What is claimed is:

1. An alkenyl-containing siloxane copolymer prepared by a process comprising:
   in a first step, reacting
      a compound (1) having at least three aliphatic double bonds, of the general formula $$R^2(CR^3{=}CH_2)_x$$

where
      $R^2$ is a trivalent or tetravalent hydrocarbon radical having 1 to 25 carbon atoms per radical, or is a trivalent or tetravalent silane radical,
      $R^3$ is a hydrogen atom or an alkyl radical, and
      x is 3 or 4 with
         an organosiloxane (2) having terminal Si-bonded hydrogen atoms in the presence of catalyst (3) which promotes the addition of Si-bonded hydrogen onto aliphatic double bond,
         the ratio employed of Si-bonded hydrogen in the organosiloxane (2) to aliphatic double bond in organic compound (1) being from 1.3 to 10,
   in a second step, reacting
      the resulting hydrocarbon-siloxane copolymers containing Si-bonded hydrogen atoms with
         an α,ω-dialkenylsiloxane polymer (4) having an average molecular weight of from 1000 Dalton to 15,000 Daltons in the presence of catalyst (3) which promotes the addition of Si-bonded hydrogen onto aliphatic double bond,
         the ratio employed of aliphatic double bond in the α,ω-dialkenylsiloxane polymer (4) to Si-bonded hydrogen in the hydrocarbon-siloxane copolymer being from 1.2 to 10,
   and, if desired, in a third step
      equilibrating the resulting alkenyl-containing siloxane copolymers with at least one organopolysiloxane (5) selected from the group consisting of linear organopolysiloxanes containing terminal triorganosiloxy groups, linear organopolysiloxanes containing terminal hydroxyl groups, branched organopolysiloxanes optionally containing hydroxyl groups, cyclic organopolysiloxanes, and copolymers of diorganosiloxane units and monoorganosiloxane units.

2. An alkenyl-containing siloxane copolymer as claimed in claim 1, wherein the organosiloxane (2) used is of the general formula $$HR_2SiO(SiR_2O)_nSiR_2H$$

where each R is an identical or different, optionally halogenated hydrocarbon radicals having 1 to 6 carbon atoms per radical, and n is 0 or a positive integer.

3. An alkenyl-containing siloxane copolymer as claimed in claim 1, wherein the organic compound (1) used is one in which $R^2$ is a trivalent hydrocarbon radical having 1 to 25 carbon atoms per radical, and x is 3.

4. An alkenyl-containing siloxane copolymer as claimed in claim 1, wherein the organic compound (1) used is 1,2,4-trivinylcyclohexane.

5. An alkenyl-containing siloxane copolymer as claimed in claim 1, wherein the α,ω-dialkenylsiloxane polymer (4) used is of the general formula $$R^4{}_aR_{3-a}SiO(R_2Si{-}R^1{-}SiR_2O)_m(R_2SiO)_kSiR^4{}_aR_{3-a}$$

where
   $R^1$ is an alkylene radical having 2 to 10 carbon atoms per radical or is a divalent silane or siloxane radical,
   $R^4$ is a terminally olefinically unsaturated radical having 2 to 10 carbon atoms,
   a is identical or different and is 0 or 1, on average from 0.7 to 1.0,
   m is 0 or an integer from 1 to 10, and
   k is 0 or an integer from 1 to 1000.

6. An alkenyl-containing siloxane copolymer as claimed in claim 1, wherein the α,ω-dialkenylsiloxane polymer (4) used comprises an α,ω-divinylpolydimethylsiloxane.

7. An alkenyl-containing siloxane copolymer as claimed in claim 1, wherein in a third step equilibration is carried out with an organopolysiloxane (5).

8. The alkenyl-containing siloxane copolymer of claim 7, wherein said organopolysiloxane (5) is a linear organopolysiloxane containing terminal triorganosiloxy groups, of the general formula $$R_3SiO(SiR_2O)_rSiR_3$$

where each R is an identical or different, optionally halogenated hydrocarbon radicals having 1 to 6 carbon atoms per radical, and r is 0 or an integer of from 1 to 1500.

9. A process for preparing an alkenyl-containing siloxane copolymer as claimed in claim 1, comprising:

in a first step, reacting
a compound (1) having at least three aliphatic double bonds, of the general formula $$R^2(CR^3{=}CH_2)_x$$

where
$R^2$ is a trivalent or tetravalent hydrocarbon radical having 1 to 25 carbon atoms per radical, or is a trivalent or tetravalent silane radical,
$R^3$ is a hydrogen atom or an alkyl radical having 1 to 6 carbon atoms per radical, and
x is 3 or 4
with
an organosiloxane (2) having terminal Si-bonded hydrogen atoms in the presence of catalyst (3) which promotes the addition of Si-bonded hydrogen onto aliphatic double bond,
the ratio employed of Si-bonded hydrogen in the organosiloxane (2) to aliphatic double bond in organic compound (1) being from 1.3 to 10, in a second step, reacting
the resulting hydrocarbon-siloxane copolymers containing Si-bonded hydrogen atoms with
an α,ω-dialkenylsiloxane polymer (4) having an average molecular weight of from 1000 Daltons to 15,000 Daltons in the presence of catalyst (3) which promotes the addition of Si-bonded hydrogen onto aliphatic double bond,
the ratio employed of aliphatic double bonds in the α,ω-dialkenylsiloxane polymer (4) to Si-bonded hydrogen in the hydrocarbon-siloxane copolymer being from 1.2 to 10, and, if desired, in a third step
equilibrating the resulting alkenyl-containing siloxane copolymers with at least one organopolysiloxane (5) selected from the group consisting of linear organopolysiloxanes containing terminal triorganosiloxy groups, linear aminopolysiloxane containing terminal hydroxyl groups, branched organopolysiloxanes optionally containing hydroxyl groups, cyclic organopolysiloxanes, and copolymers of diorganosiloxane units and monoorganosiloxane units.

10. The process of claim 9, which is conducted in an organic solvent.

11. A crosslinkable composition comprising
(A) an alkenyl-containing siloxane copolymer(s) as claimed in claim 1,
(B) an organopolysiloxane containing at least 2 Si-bonded hydrogen atoms, and
(C) a catalyst which promotes the addition of Si-bonded hydrogen onto aliphatic double bonds.

12. The crosslinkable composition of claim 11, further comprising (D), an inhibitor.

13. The crosslinkable composition of claim 11, further comprising (E), a solvent.

14. A coating which repels tacky substances, comprising the crosslinked reaction product of the composition of claim 11.

15. A siloxane copolymer containing Si-bonded hydrogen atoms, prepared by a process comprising: reacting
an organic compound (1) having at least three aliphatic double bonds, of the general formula $$R^2(CR^3{=}CH_2)_x$$

where
$R^2$ is a trivalent or tetravalent hydrocarbon radical having 1 to 25 carbon atoms per radical, or is a trivalent or tetravalent silane radical,
$R^3$ is a hydrogen atom or an alkyl radical having 1 to 6 carbon atoms per radical, and
x is 3 or 4 with
an organosiloxane (2) having terminal Si-bonded hydrogen atoms, of the general formula $$HR_2SiO(SiR_2O)_nSiR_2H$$

where each R is an identical or different, optionally halogenated hydrocarbon radical having 1 to 6 carbon atoms per radical, and
n is an integer from 10 to 2000,
in the presence of a catalyst (3) which promotes the addition of Si-bonded hydrogen onto aliphatic double bond,
the ratio employed of Si-bonded hydrogen in the organosiloxane (2) to aliphatic double bond in organic compound (1) being from 1.3 to 10.

16. A siloxane copolymer containing Si-bonded hydrogen atoms, prepared by the process comprising:
equilibrating, in a further step,
the siloxane copolymers containing Si-bonded hydrogen atoms prepared by the process of claim 15, with at least one organopolysiloxane (5) selected from the group consisting of linear organopolysiloxanes containing terminal triorganosiloxy groups, linear organopolysiloxanes containing terminal hydroxyl groups, branched organopolysiloxanes optionally containing hydroxyl groups, cyclic organopolysiloxanes, and copolymers of diorganosiloxane units and monoorganosiloxane units.

17. A process for preparing an alkenyl-containing siloxane copolymer, comprising:
in a first step, reacting
an organic compound (1) having at least three aliphatic double bonds, of the general formula $$R^2(CR^3{=}CH_2)_x$$

where
$R^2$ is a trivalent or tetravalent hydrocarbon radical having 1 to 25 carbon atoms per radical, or is a trivalent or tetravalent silane radical,
$R^3$ is a hydrogen atom or an alkyl radical having 1 to 6 carbon atoms per radical, and
x is 3 or 4 with
an organosiloxane (2) having terminal Si-bonded hydrogen atoms, in the presence of catalyst (3) which promotes the addition of Si-bonded hydrogen onto aliphatic double bonds, the ratio employed of Si-bonded hydrogen in the organosiloxane (2) to aliphatic double bonds in the organic compound (1) being from 1.3 to 10, and in a second step, equilibrating the resulting siloxane copolymers containing Si-bonded hydrogen atoms with at least one organopolysiloxane (5) selected from the group consisting of linear organopolysiloxanes containing terminal triorganosiloxy groups, linear organopolysiloxanes containing terminal hydroxyl groups, branched organopolysiloxanes optionally containing hydroxyl groups, cyclic organopolysiloxanes, and copolymers of diorganosiloxane units and monoorganosiloxane units and in a third step, reacting the resulting hydrocarbon-siloxane copolymers containing Si-bonded hydrogen atoms with an $\alpha,\omega$-dialkenylsiloxane polymer (4) having an average molecular weight of from 1000 Daltons to 15,000 Daltons in the presence of catalyst (3) which promotes the addition of Si-bonded hydrogen onto aliphatic double bond, the ratio employed of aliphatic double bond in the $\alpha\omega$-dialkenylsiloxane polymer (4) to Si-bonded hydrogen in the hydrogen-siloxane copolymer being from 1.2 to 10.

* * * * *

UNITED STATES PATENT AND TRADEMARK OFFICE
CERTIFICATE OF CORRECTION

PATENT NO. : 6,265,497 B1
DATED : July 24, 2001
INVENTOR(S) : Christian Herzig

It is certified that error appears in the above-identified patent and that said Letters Patent is hereby corrected as shown below:

<u>Column 17, claim 9,</u>
Line 54, delete "aminopolysiloxane" and insert -- organopolysiloxanes --.

<u>Column 20, claim 17,</u>
Line 10, delete "αω-dialkenylsiloxane" and insert -- α,ω-dialkenylsiloxane --

Signed and Sealed this

Twelfth Day of March, 2002

Attest:

JAMES E. ROGAN
*Attesting Officer*     *Director of the United States Patent and Trademark Office*